Figure 1:
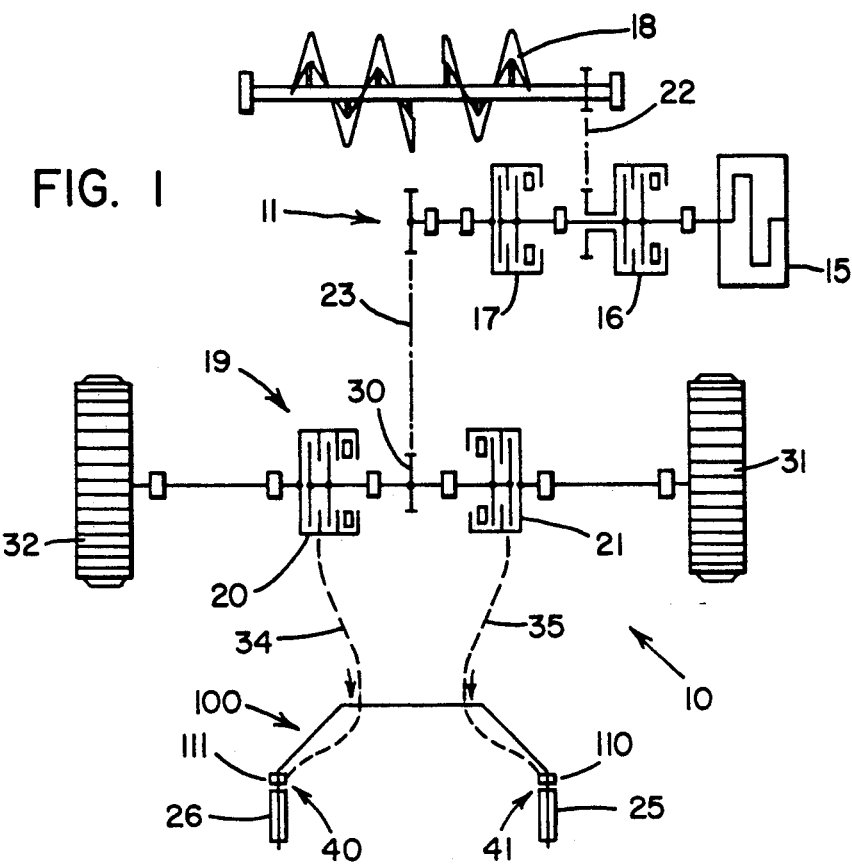

United States Patent [19]

Buchdrucker

[11] Patent Number: 5,018,592
[45] Date of Patent: May 28, 1991

[54] STEERING CONTROL FOR SNOWBLOWERS

[75] Inventor: Ewald Buchdrucker, Columbia Station, Ohio

[73] Assignee: MTD Products Inc., Cleveland, Ohio

[21] Appl. No.: 339,169

[22] Filed: Apr. 17, 1989

Related U.S. Application Data

[63] Continuation-in-part of Ser. No. 180,204, Apr. 11, 1988, abandoned.

[51] Int. Cl.$^5$ ............................................. B62D 51/04
[52] U.S. Cl. .................................. 180/19.3; 180/6.2;
192/20; 192/49; 37/244; 475/26; 475/29;
475/214; 475/223
[58] Field of Search ............ 180/19.3, 19.1, 6.2,
180/9.22, 6.2, 6.24, 6.32, 6.38; 192/20, 49;
74/785, 786, 787; 37/244, 246

[56] References Cited

U.S. PATENT DOCUMENTS

| | | | |
|---|---|---|---|
| 1,734,718 | 11/1929 | Donald | 182/49 |
| 2,137,778 | 11/1938 | McCullough | 74/785 |
| 2,566,724 | 9/1951 | Heil | 192/49 |
| 2,605,651 | 4/1952 | Winther | 74/785 |
| 2,684,740 | 7/1954 | Mader | 192/49 |
| 2,692,445 | 6/1948 | Darnell | 180/19.1 |
| 2,756,615 | 7/1956 | Kantz | 180/19.1 |
| 4,262,765 | 4/1981 | Nomura | 180/19.3 |
| 4,756,101 | 7/1988 | Frieberg et al. | 37/244 |

FOREIGN PATENT DOCUMENTS

| | | | |
|---|---|---|---|
| 0270238 | 11/1988 | Japan | 180/19.3 |
| 1360652 | 7/1974 | United Kingdom | 180/19.3 |

*Primary Examiner*—Charles A. Marmor
*Assistant Examiner*—Anne Marie Boehler
*Attorney, Agent, or Firm*—Woodling, Krost & Rust

[57] ABSTRACT

The disclosure relates to the use of two clutches, one associated with each wheel of a two wheel snowblower, selectively operated by a pivoting control on the handle so as to allow for power steering of the snowblower.

23 Claims, 7 Drawing Sheets

STEERING CONTROL FOR SNOWBLOWERS

The present invention relates to a steering control for snowblowers.

Snowblowers are very useful implements for removing great quantities of snow from sidewalks, drives and other passageways. The direction of travel of snowblowers is typically controlled through the physical manipulation of the snowblower via a long, rearwardly extending handle. With small light weight snowblowers (50 pounds) this directional control is readily accomplished by anyone (if anything the problem is directly opposite—too much direction changing). However, the larger units can frequently weigh 200 pounds or more. With these heavier units it is a struggle for even a grown man to consistently control the direction of travel of the unit, especially since a differential is not normally incorporated into the drive train of the snowblowers. Some maneuvers, such as a 90 degree turn through a narrow doorway into a storage location between two cars, are simply beyond most people's ability.

The present invention addresses this problem by providing a power control of the steering of snowblowers. In the invention a selective deviation of a few degrees on neutral biased pivoting levers or handle bars deactivates the drive connection between the motor and the wheel (or tread) on a lateral side of the snowblower. This deactivation in turn causes the snowblower to pivot about the deactivated wheel and thus turn. Returning the pivoting levers or handle bars to a central position reactivates the drive connection to the wheel and thus stops the turn. The steering of the snowblower can therefor be accomplished by anyone strong enough to pivot the lever or handle bars against the neutral bias.

Other objects and a more complete understanding of the invention may be had by referring to the following description and claims, taken in conjunction with the drawings in which:

DRAWINGS

Figure 5:
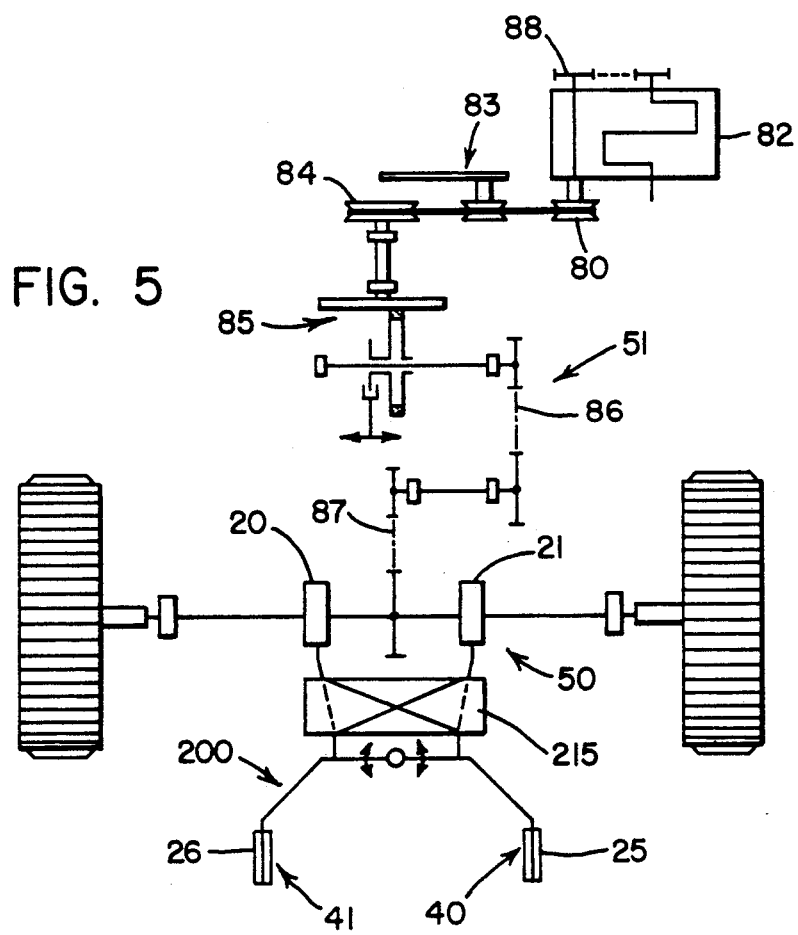
Figure 2:
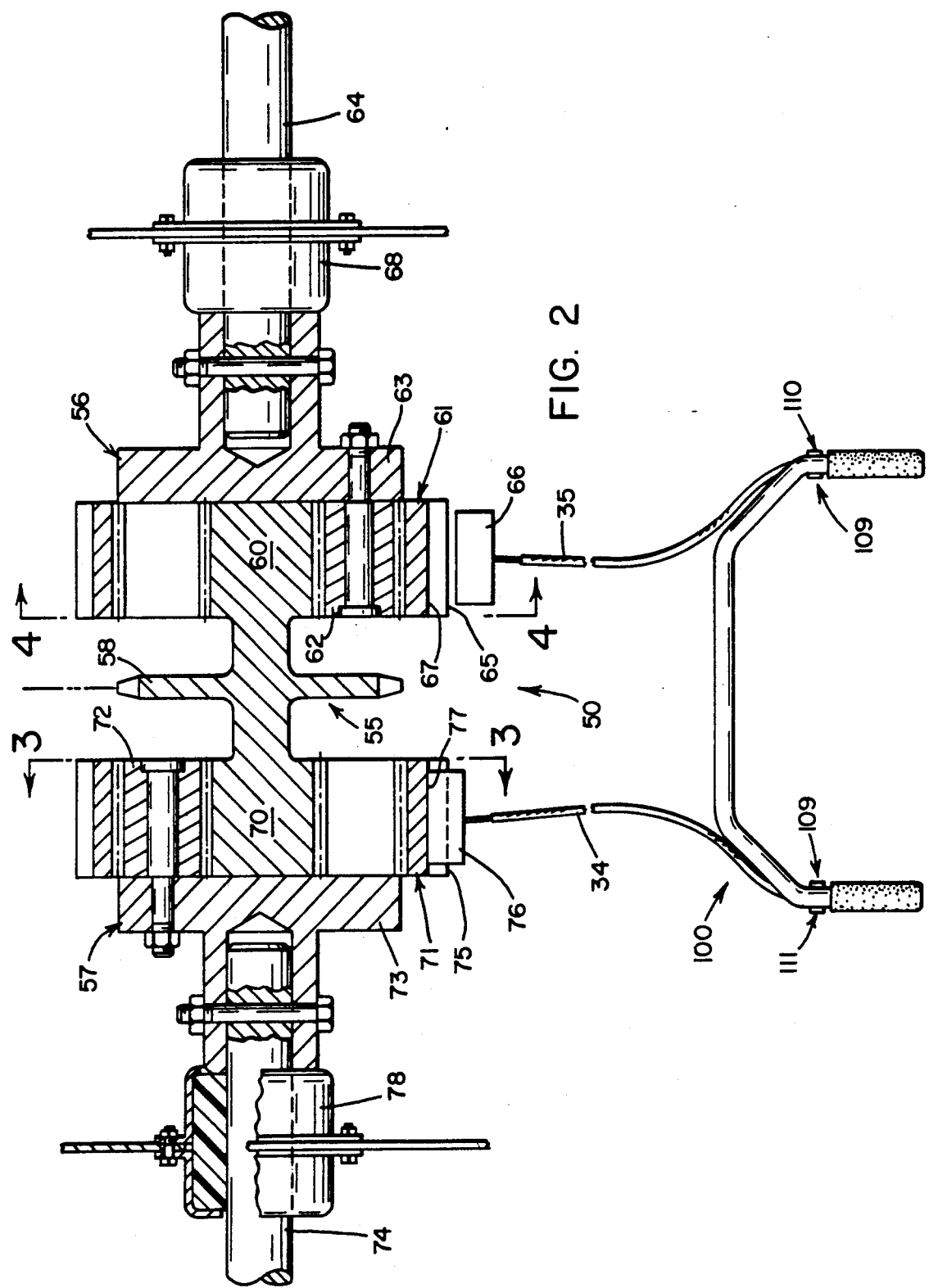
Figure 3:
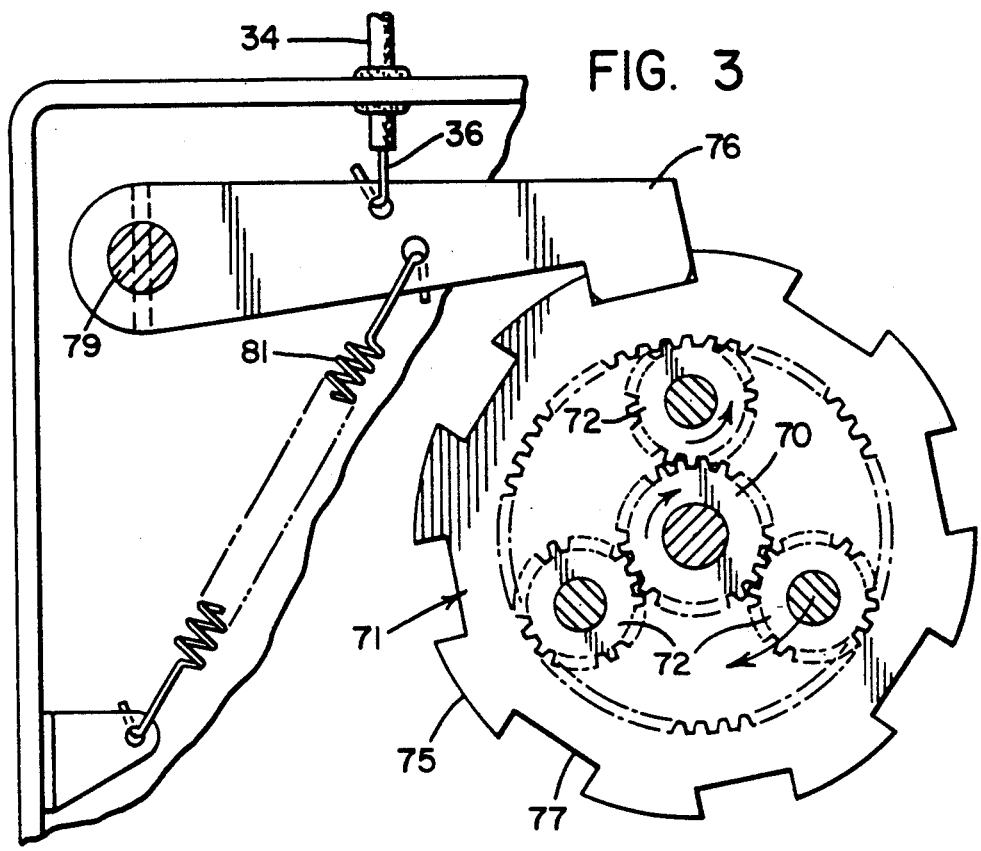
Figure 4:
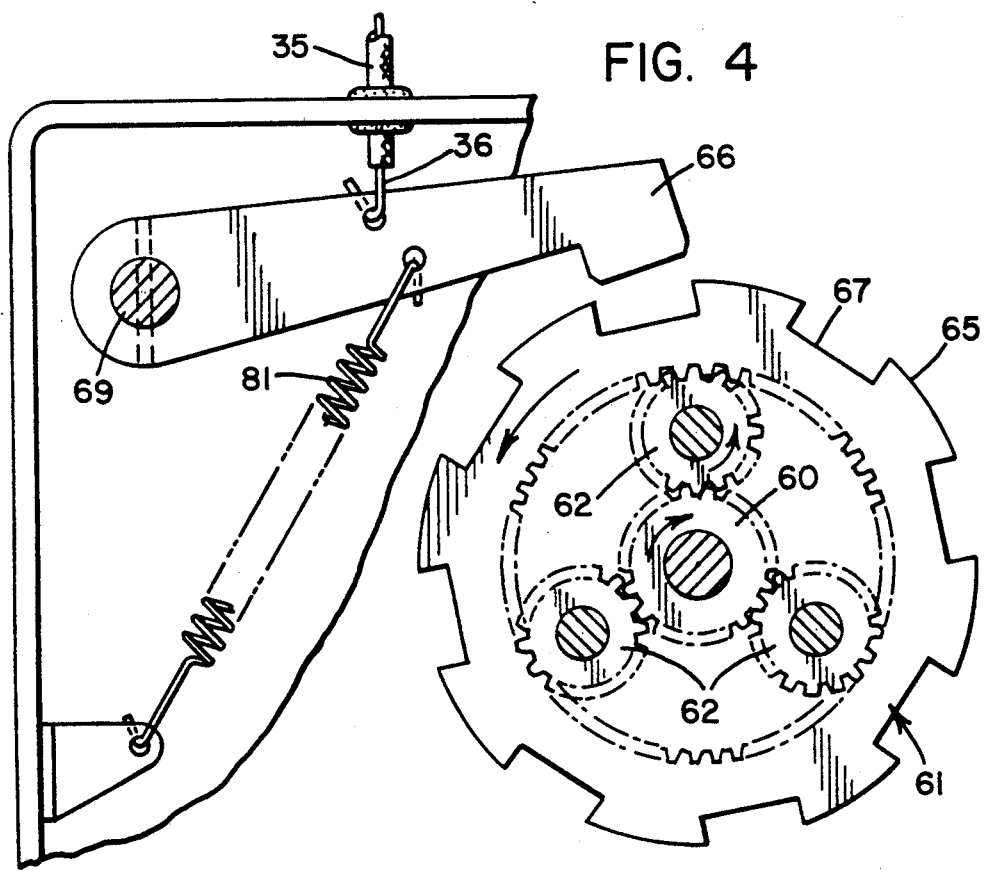
Figure 7:
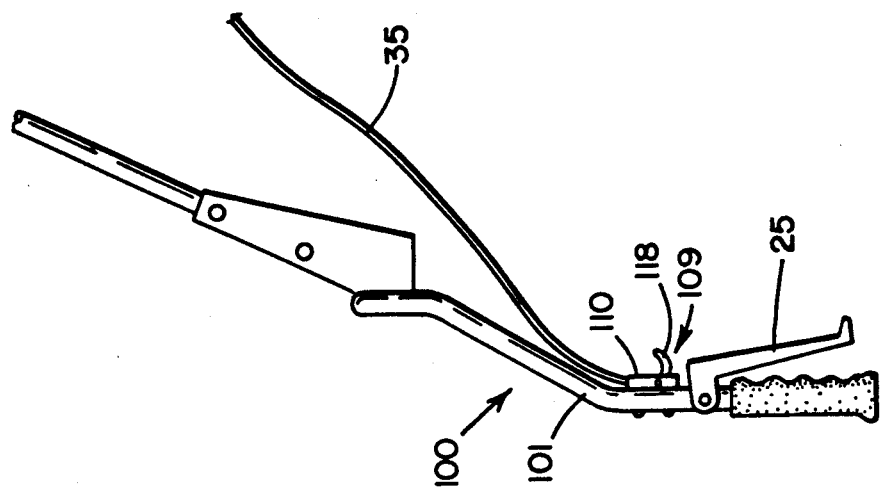
Figure 6:
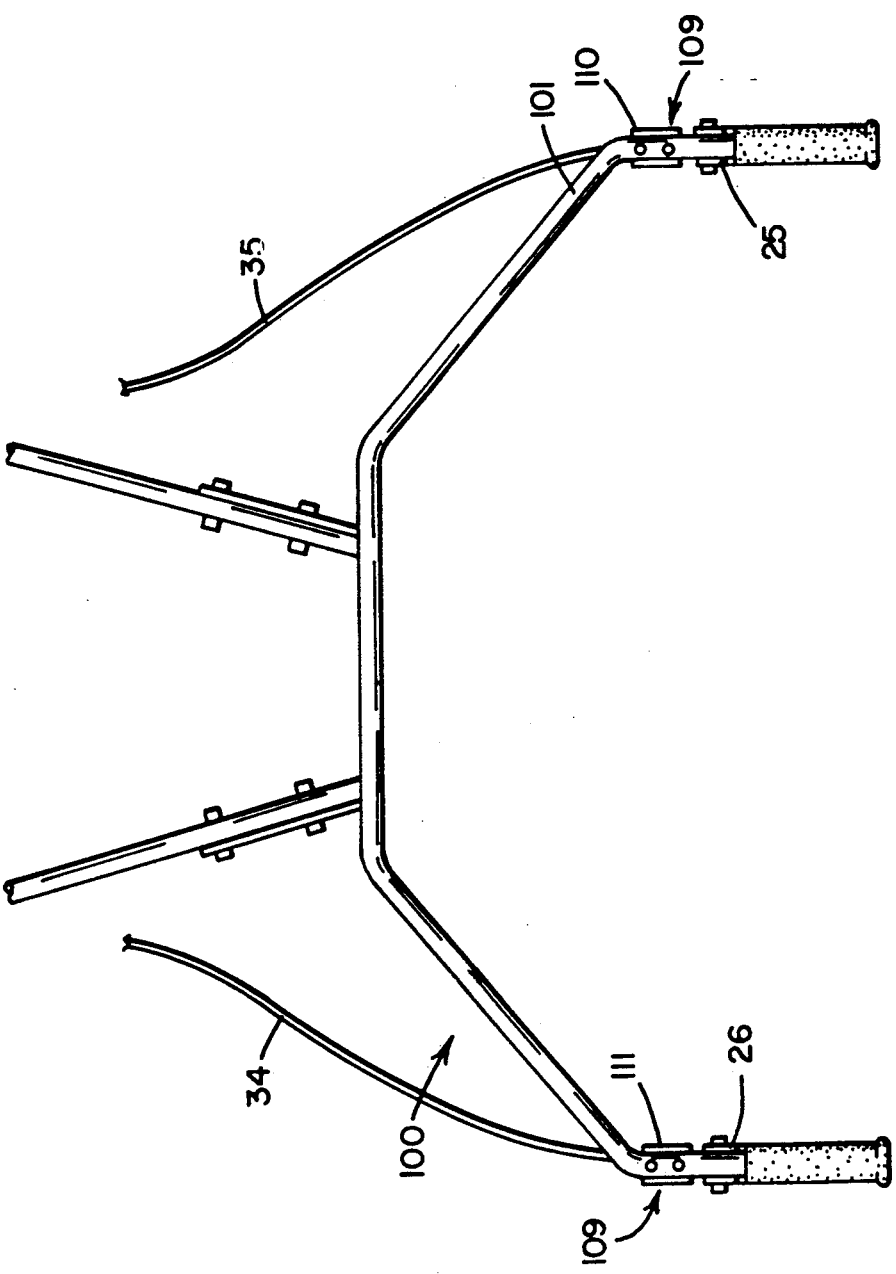
Figure 8:
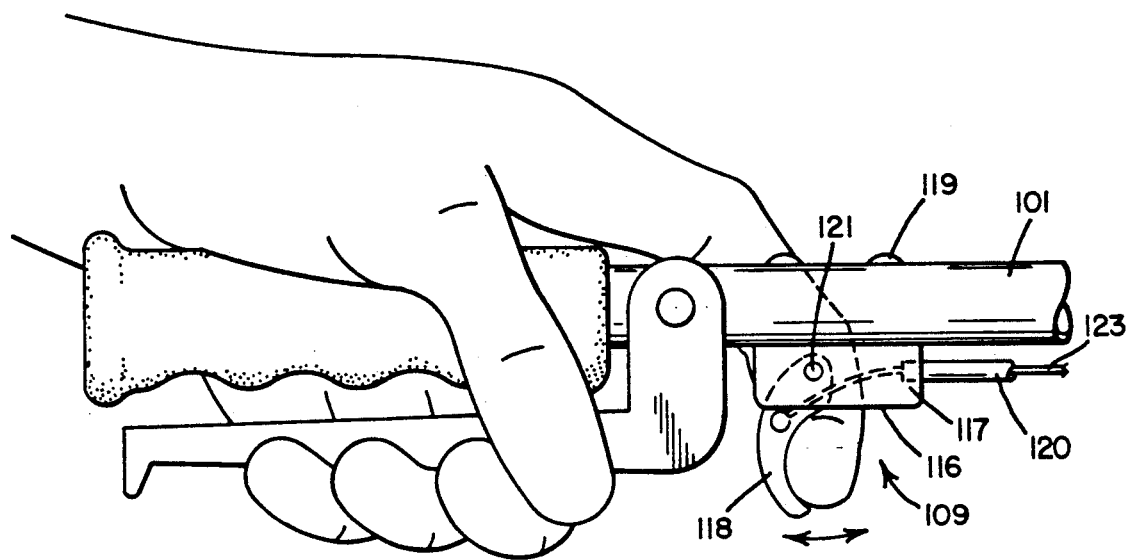
Figure 9:
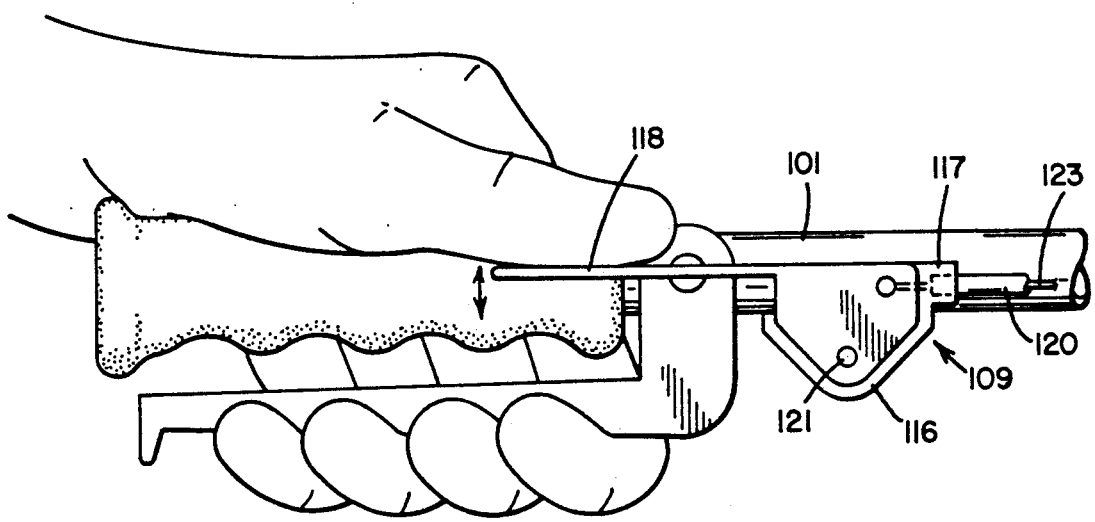
Figure 11:
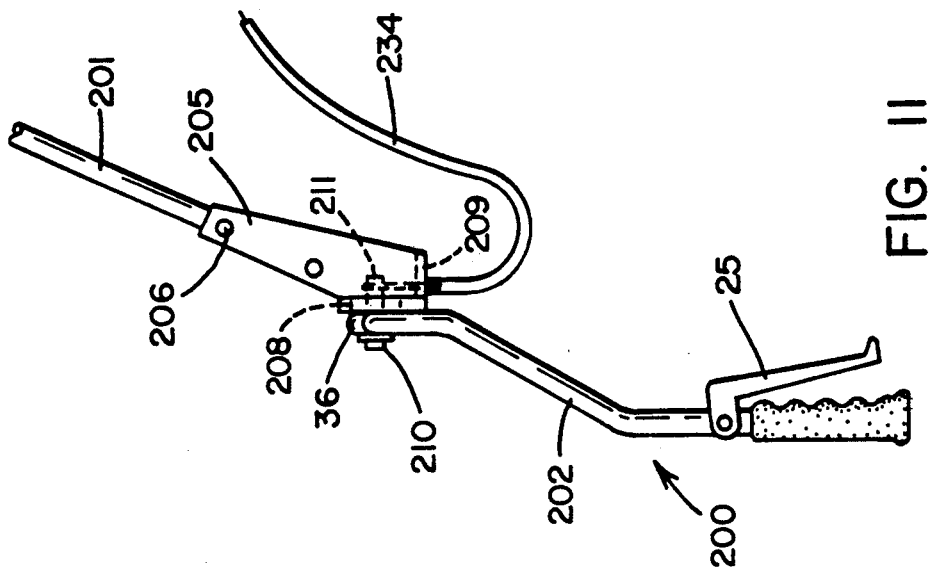
Figure 10:
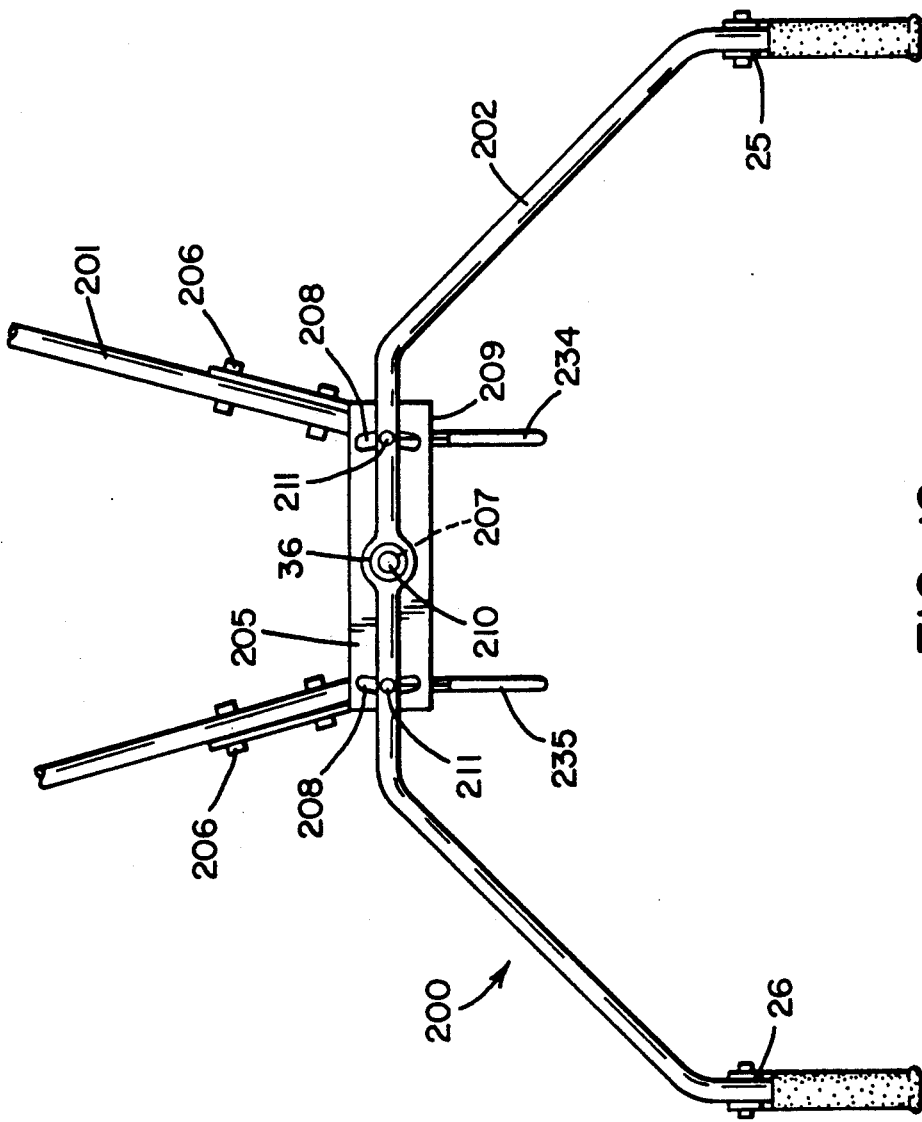
Figure 12:
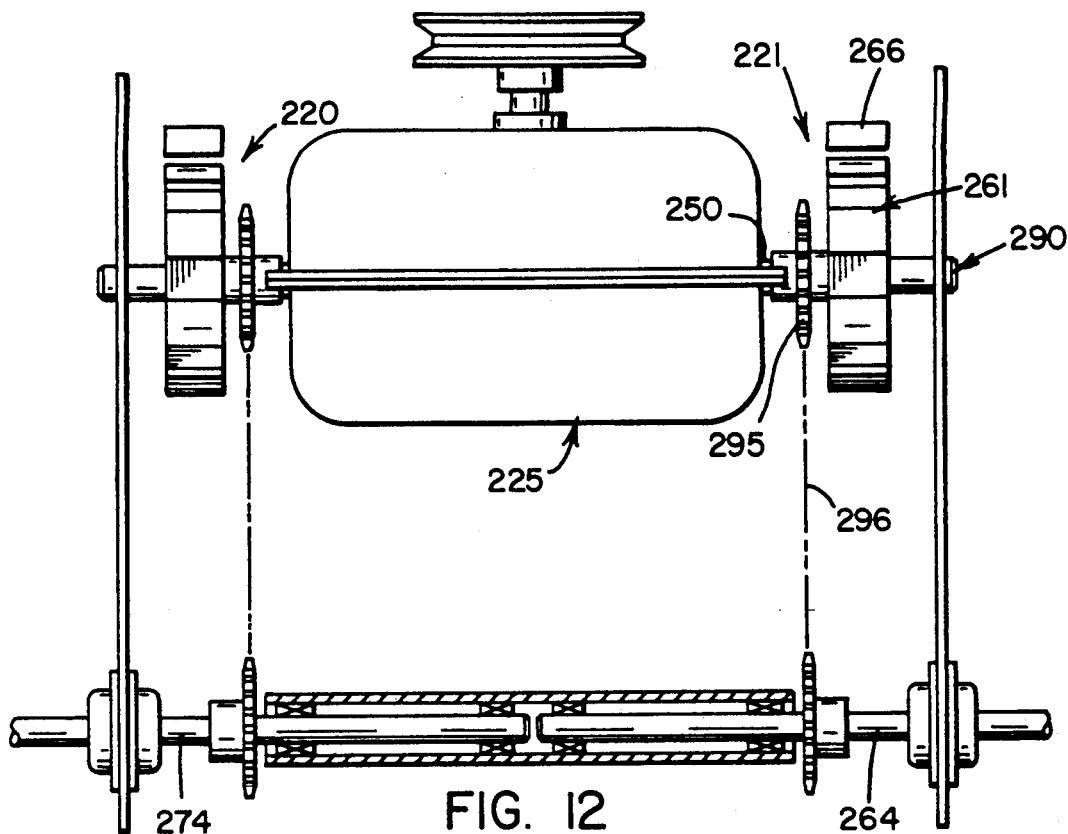
Figure 13:
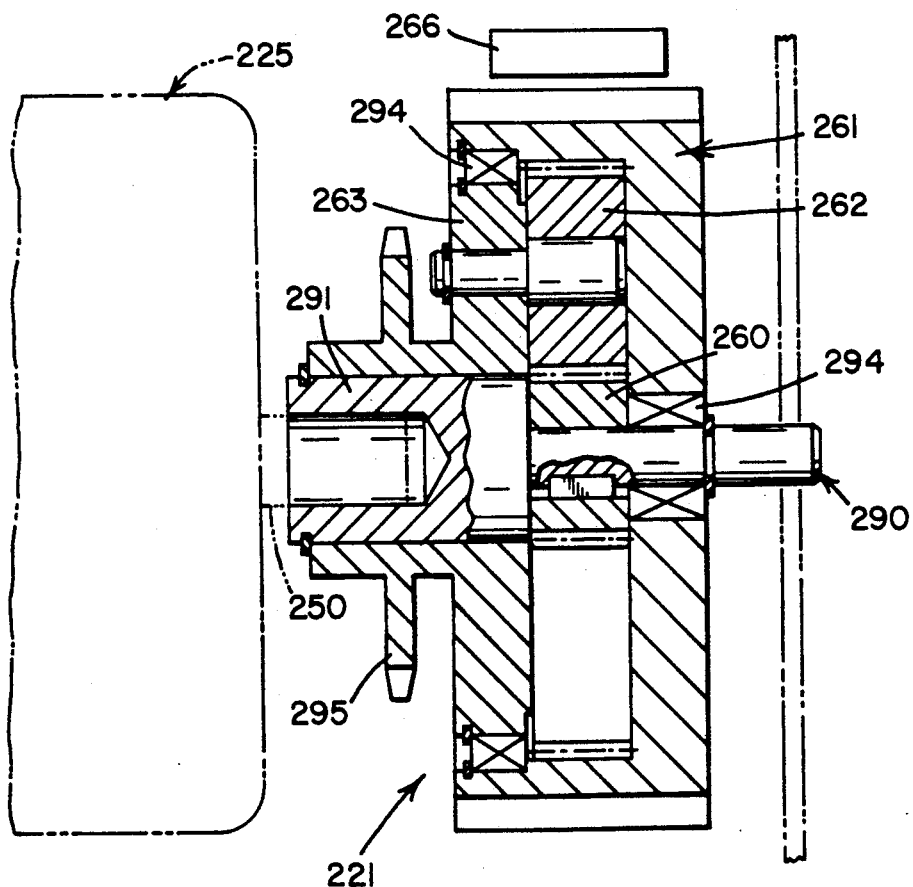

FIG. 1 is a diagram of the preferred embodiment of the invention incorporating dual trigger levers, FIG. 2 is a lateral cross-sectional view of a snowblower final drive incorporating the invention of this application, FIG. 3 is a cross-sectional view of an engaged clutch pack of the drive of FIG. 2 taken along lines 3—3 of that figure, FIG. 4 is a cross-sectional view of an disengaged clutch-pack of the drive of FIG. 2 taken along lines 4—4 of that figure, FIG. 5 is a diagram of a drive train of a snowblower incorporating the final drive of FIG. 2 and pivoting handle bars, FIG. 6 is a downward detail view of a set of handle bars incorporating the trigger controls of FIG. 1, FIG. 7 is a sideward view of the handle bars of FIG. 6, FIG. 8 is an enlarged view of the trigger control if FIG. 6, FIG. 9 is an enlarged view of a modified trigger control, FIG. 10 is a downward detail view of the pivoting handle bars control of FIG. 2, FIG. 11 is a sideward view of the handle bars of FIG. 10, FIG. 12 is an end view of a gear-box embodiment of the invention, and FIG. 13 is a cross-sectional view of the clutch pack of the gear-box embodiment of FIG. 12.

DESCRIPTION

The present invention is illustrated in its preferred form as a power directional control 10 for snowblowers. The directional control 10 includes a drive system 11 and a pivoting lever (FIG. 1) or integral handle bar control (FIG. 5).

The drive system 11 includes an engine 15, a snowblower clutch 16, a drive clutch 17, and a final drive 19 including two independent wheel clutches 20, 21.

The engine 15 is preferably a small internal combustion engine of about 5 to 10 horsepower. The throttle control 14 for the engine is mounted on one handlebar. The engine 15 is drivingly connected to the snowblowers' operating systems through the single snowblower clutch 16. The engagement/disengagement of this clutch 16 is controlled through selective manipulation of a lever 25 located on the right arm of the handle bars 100. The clutch 16 is normally disengaged. The output of this main clutch 16 is connected to the snowblower auger 18 via a chain 22. The auger 18 itself is of conventional design and construction.

The drive clutch 17 is engaged/disengaged through the selective manipulation of a lever 26 located on the left arm of the handle bars 100. Upon engagement of the drive clutch 17 the final drive 19 is driven via the chain 23. The clutch 17 is also normally disengaged.

The final drive 19 has wheel clutches 20, 21 intermediate the input sprocket 30 and the two wheels (or treads) 31, 32. The wheel clutches 20, 21 are normally engaged such that the wheels 30, 31 are driven by the chain 23. Two control cables 34, 35 extend from these clutches 20, 21 to the pivoting controls 40, 41 of the handle bars. Other mechanisms —levers, solenoids with switches, etc. could also be utilized. The controls are pivoted for a limited movement in respect to a neutral, preferably spring biased position. Upon movement of the control for the left (40) the clutch 20 is disengaged. Since at this time power will only be applied to the right wheel, the snowblower 10 will turn left on forward motion. On return of the control for the left to its neutral position the clutch 20 is again engaged: the snowblower 10 returns to movement in a straight direction. The snowblower 10 will move right on forward motion in a similar fashion upon pivoting control for the right (41) to disengage the wheel clutch 21.

The specific left 40 and right 41 control are selected from a number of options: individual controls (FIG. 12, 6–9), pivoting handle bars (FIG. 2, FIG. 5 10–11), a single flipper, or otherwise.

The trigger controls 109 (FIGS. 6–9) are mounted on each arm of a fixed handle bar respectively for individual and separate control of each clutch. Manipulating a particular trigger backwards (FIG. 8), downwards (FIG. 9) or otherwise disengages the appropriate clutch. It is preferred that the clutch is on the same side as the individual lever that controls it. Since the handle bar itself is solidly connected to the frame of the snowblower conventional manual control can also be utilized independently of the trigger controls 109.

The pivoting handle bars 200 (FIGS. 10, 11) are pivoted to the frame for a limited movement in a particular direction disengaging the appropriate clutch. After a few degrees beyond the location of wheel clutch disengagement the handle bars contact a positive stop. This positive stop prevents further rotation of the handle bars 200. This positive stop allows the snowblower 10 to be physically manhandled abut as in a conventional snowblower if desired (for example when the engine is not running or in an emergency).

A single flipper would coordinate the control of both clutches 20, 21 to a single lever mounted to a fixed handle bar 100, the movement thereof from a neutral position in one direction would disengage one clutch and the movement thereof from a neutral position in the other direction would disengage the other clutch. The particular clutch controlled for a particular movement of the flipper would depend on the location of the flipper and control desired. Again since the handle bar itself is solidly connected to the frame of the snowblower conventional manual control can also be utilized.

The invention of this application thus provides the best of both worlds—power steering with a manual backup.

The preferred embodiment of the invention is described in FIGS. 2-8.

The preferred embodiment begins with the general construction of a snowblower such as that shown in the manual of the Sears Model 317-840, 850 series snowblowers. There are, however, two significant departures: a) the drive and b) the pivoting steering controls of the handle bars.

The Drive

In the Sears Model 317-840, 850 series, the drive is a straight axle connected by high ratio reduction chain drives through a clutching variator mechanism to the main engine output shaft. In contrast in the preferred embodiment of this application the drive is a clutching planetary reduction axle 50 connected by a series of lower ratio chain drives 51 through a variator mechanism 85 and a belt clutch 83 to the cam shaft 88 of the main engine.

The clutching planetary reduction axle 50 (FIG. 2) has a central free floating chain driven twin sun gear assembly 55 supported by two planetary gear half shafts 56, 57. The twin sun gear assembly 55 transfers the power from the incoming drive sprocket 58 to the two opposing sun gears 60, 70. Two ring gears 61, 71 are located concentrically about the two sun gears 60, 70 with planet gears 62, 72 located therebetween. The planet gears 62, 72 are rotatively mounted to planet carriers 63, 73. The planet carriers 63, 73 are in turn bolted to the two tread supporting half—shafts 64, 74. The half shafts 64, 74 themselves are rotatively mounted by bearings 68, 78 to the frame of the snowblower.

In a normal carrier output planetary drive mechanism of this nature the ring gears are not ever allowed to rotate. In the invention of this application this is also normally true; each of the ring gears 61, 71 has a toothed outer diameter 65, 75 with a pawl 66, 76 that is engaged with one of the teeth 67, 77 to prevent the rotation of the ring gear 61, 71 (the pawl 66, 76 is connected to the frame about a pivot point 69, 79 spring loaded into engagement with the ring gear by a spring 81). When a ring gear 61, 71 cannot rotate, any rotation of a sun gear 60, 70 causes the associated planet 62, 72 to orbit rotating the planet carrier 63, 73 and thus the associated tread of the device. (FIG. 3). This driving connection is the normal operating position of the pawls 66, 76. However, in the invention of this application the pawls are movable. Upon movement of the pawl away from the ring gear (contrast FIG. 4 with FIG. 3), the ring gear is free to rotate. When a ring gear 61, 71 can rotate, any rotation of a sun gear 60, 70 causes the associated planet 62, 72 and the associated ring gear 61, 71 to rotate: the planet carrier 63, 73, and thus the associated tread of the device, is free to move as it will.

The pawls themselves are moved away from the ring gear 61, 71 against the pressure of the spring 81 by a control cable 34, 35 respectively connected to the pivoting clutch controls (later detailed). This disengagement connection is the turning position of the pawls 66, 76.

The pawl-planetary ring gear disengagement mechanism is preferred as the clutch for both its positive engagement and longevity attributes although other disengagement mechanisms could also be used if desired.

In respect to positive engagement, the pawl has only to contact a single tooth to activate the wheel drive. There is no slippage as could occur with band or disk engagement type clutches.

In respect to longevity, snowblowers have large engines and significant final drive torque. Before the pawl and toothed ring gear will have problems handling this torque something must positively break (an unlikely event and also difficult to overlook). There is no gradual deterioration or need for adjustment.

The planetary clutches themselves reduce the speed of the input drive lowering the reduction requirements for the drive proceeding the final drive. In the preferred embodiment shown (in FIG. 5) a 2 inch pulley 80 on the cam shaft 88 of the engine 82 (a 2 to 1 reduction from the main engine shaft) is connected through a manually activated belt clutch 83 to a 6 inch pulley 84. The belt clutch is manually controlled through a clutch lever on the handle bars 100. The 6 inch pulley 84 drives the variator mechanism 85. The variator mechanism in turn is connected by two chains (86—7 teeth to 14 teeth, 87—8 teeth to 24 teeth) to the final drive 50 of FIG. 2 (which adds its own 3.4 to 1 reduction). All shafts have bearings to the frame. The engine is thus connected to the wheels in a series of similar two or three to one speed reduction steps. This reduces the wear (by eliminating high speed parts) and otherwise increases the longevity of the device. (As in the FIG. 1 the snowblower auger is separately driven).

The Controls on the Handle Bars

In the Sears Model 317-840, 850 series, the handle bars are fixedly connected to the frame of the snowblower for total manual control of direction. In these units any sideways movement of the handle bars is physically transformed directly into sideways movement of the snowblower. The amount of force needed to turn the snowblower is directly proportional to the weight of the snowblower and the resistance to turning (Since most snowblowers do not have differentials one must drag the wheels over the ground to turn the snowblower). The main snowblower and drive clutches on the ends of the handle bars must be held during this turning if uninterrupted operation is desired.

In the preferred embodiment of this invention (FIGS. 6-8) there are individual controls 110, 111 mounted on the handle bars 100 for a minor degree of activating movement in respect thereto. These controls themselves could have pivoting (as shown), sliding or other movement. The handle bars 100 themselves are fixedly connected to the frame of the snowblower in a conventional manner (normally by small bolts).

The individual controls 110, 111 preferred are pivoting triggers 109 mounted near the ends of the arms of the handle bars 100 just inward of the actual handle and snowblower controls (FIG. 8). Each trigger 109 includes a mounting block 116, a cable stop 117 and a pivoting trigger 118. The mounting block 116 is fixedly connected to the handle bar tube 101 by bolts 119. The cable stop 117 affixes the control cable from the drive clutches to the mounting block 116. The trigger 118 is pivoted to the mounting block 116 via a pivot pin 121. The control cable 120 from that particular sides disengagement clutch connected to the mounting block 116 with the control wire 123 leading to the trigger 118 below the pivot pin 121. Since the other ends of the control cables extend to the two clutches in the final drive 50 the spring 81 of these clutches also bias the triggers 118 into a neutral position. The triggers 118 could be separately biased if desired. The triggers 110, 111 are preferably mounted such that an operator's index finger falls naturally on the trigger when the operator's hand is in an operational position on the end of the handle bars. In a variation of this embodiment the triggers are mounted for a downwards control movement with thumb actuation (FIG. 9).

The other parts of the snowblower—the controls on the handle bars, the snowblower clutch, drive clutch, throttle, safety mechanisms, etc.—and overall operation of the snowblower remain unchanged.

If the operator pulls a trigger 118 on the handle bars 100 when the main drive is engaged (drive clutch on), the operator produces a turn towards the side on which he manipulated the trigger 118 control (by disengaging that sides wheel clutch). The total amount of control movement to accomplish this is minimal. On return of the trigger 118 to neutral the snowblower continues its forward motion. If the operator pivots both of the trigger controls when the main drive is engaged (drive clutch on), forward movement of the snowblower stops.

At any time a significant effort towards manual control via the handle bars 100 (with the drive engaged or disengaged) will physically move the snowblower (by brute force). The ability to physically move the snowblower is thus not compromised from that normally present in a regular snowblower.

In a modified version of this invention (FIGS. 5, 10, 11) the handle bars 200 are mounted for a minor degree of pivoting motion in respect to the snowblower. The lower part 201 of the handle bars 200 are fixedly connected to the frame of the snowblower in a conventional manner (normally by small bolts). The lower part 201 of the handle bars 200 terminates in a flat pivoting platform 205 fixedly bolted thereto (by bolts 206). The pivoting platform 205 itself has central 1 inch diameter bearing hole 207, two edge slots 208 ½ inch × 1 ½ inch in size and a downwardly extending flange 209. The distance between the slots 208 is about one foot. The upper part 202 of the handle bars 200 have a central downwardly extending 1 inch diameter pivot 210 and two downwardly extending ½ inch diameter pins 211. To assemble the upper 202 and lower 201 sections of the handle bars 200 into an operational unit the pivot 210 of the handle bars 200 is fitted into the central bearing hole 207 in the hub 36 with the two pins 211 extending into the edge slots 208. All of the pivot 210 and pins 211 extend through the pivoting platform 205 into the area underneath. A snap ring (not shown) on the lower side of the pivot 210 locks the two parts of the handle bars together against separation. The pins 211 are then connected to two control cables 234, 235 running off of the flange 209 beneath the platform 205. The other end of these control cables extend to the two clutches in the final drive 50. The springs 81 of these clutches in the preferred embodiment bias the handle bars 202 into a neutral position. The handle bars could be separately biased if desired. (Note that since the control cables 234, 235 are connected to the pins 211 from the operator end of the platform 205, the interconnection of the cables 234, 235 to the clutches are interchanged—i.e. the left pin 211 is connected to the right clutch and visa versa. The operation of the total device, pivot handle bars left (right) means turning left (right), is unchanged.) If the operator pivots on the handle bars 202 when the main drive is engaged (drive clutch on), the operator produces a turn towards the side he pivots the handle bars (by disengaging that sides wheel clutch). The total amount of pivoting to accomplish this is but a few degrees. On return of the handle bars 202 to neutral the snowblower continues its forward motion.

If the operator pivots the handle bars 200 when the main drive is disengaged (drive clutch off) or makes a significant effort towards manual control with the drive engaged nothing happens until the pins 211 contact the end of the slots 208. At this point continued movement will physically move the snowblower (by brute force). Given the limited degree of pivoting motion that occurs until there is solid contact, the ability to physically move the snowblower is not significantly compromised from that normally present in a regular snowblower.

Note that under certain circumstances a reverse inversion mechanism 215 may be inserted between the steering controls (triggers, pivoting handle bars or whatever) to invert the control sequence (i.e. connect the control cables to the opposite side clutch) when the snowblower transmission is placed into reverse. This inversion of operation modifies the backing up operation of the controls in a manner pleasing to some operators.

This invention has been described in its preferred form with a certain degree of particularity. It is to be understood that numerous changes may be made without departing from the invention as claimed. For example the invention has been described with a continuously variable wheel and disk speed alteration mechanism. If the appropriate other speed change mechanisms could be substituted. FIGS. 12 and 13 shows just such a mechanism. In this alternate device a five speed gear box 225 is utilized, with the planetary clutches 220, 221 located off of the two output stubs 250 extending out of the two lateral sides thereof. The output stubs 250 are the two ends of an elongated single shaft that normally extends out of one side or the other of the gearbox 225. The stubs 250 drive the sun gear 260 of the planetary clutch via a reduction shaft 290 that extends between the gear box 225 and the frame of the snowblower. A planet carrier 263 rotatively surrounds the large diameter portion 291 of the input reduction shaft 290. The planet gears 262 are rotatively connected to the planet carrier 263 for rotation therewith. The ring gear 261 surrounds the planet gears 262 and carrier 263 with bearings 294 to the small diameter portion of the input reduction shaft 290 and the planet carrier 263. A pawl 266 is located about the ring gear 261 to selectively prevent the rotation thereof. The output of the planetary clutches 220, 221 is via a sprocket 295 on the planet carrier 263 with a chain drive 296 to the final half-shaft wheel drives 264, 274. The operation of this modified device is similar to that of the embodiment of FIGS. 1-9.

Other changes and modifications are also possible. For example the controls have been described as symmetric—left control movement to left clutch disengagement—an asymmetric connection could also be utilized. In addition if desired a reverse lockout could be included to deactivate the controls on the reverse movement of the snowblower. Therefore, although this invention has been described in its preferred form with a certain degree of particularity, it is to be understood that numerous changes may be made without deviating from the invention as hereinafter claimed.

What is claimed is:

1. A snowblower having two laterally opposed drive members operationally rotated by an engine, a frame and handle bars having two arms; an improved power assisted steering comprising a power input sun gear assembly, said sun gear assembly having an input drive intermediate to two sun gears, means to selectively connect said input drive to the engine, a first set of planetary gears, said first set of planetary gears surrounding one of said sun gears, a first planet carrier, means to rotatively drivingly connect said first set of planetary gears to said first planet carrier, means to connect said first planet carrier to one of the two drive members, a first ring gear, said first ring gear surrounding said first set of planetary gears, said first ring gear being disconnectably connected to the frame preventing the rotation thereof, first operation means to disconnect said first ring gear from said frame so as to allow the rotation thereof, said first operation means including a pawl engaging a tooth, said pawl of said first operation means being interconnected between said first ring gear and the frame for selectively preventing the rotation of said first ring gear in respect to the frame, a second set of planetary gears, said second set of planetary gears surrounding the other of said sun gears, a second planet carrier, means to rotatively drivingly connect said second set of planetary gears to said second planet carrier, means to connect said second planet carrier to the other of the two drive members, a second ring gear, said second ring gear surrounding said second set of planetary gears, said second ring gear being disconnectably connected to the frame preventing the rotation thereof, second operations means to disconnect said second ring gear from said frame so as to allow the rotation thereof, said second operation means including a pawl engaging a tooth, said pawl of said second operation means being interconnected between said second ring gear and the frame for selectively preventing the rotation of said second ring gear in respect to the frame, one trigger control, means to pivotally mount said one trigger control to one arm of the handle bars for a degree of rotation in respect thereto from a neutral position, means to bias said one trigger control in said neutral position, a second trigger control, means to pivotally mount and second trigger control to the other arm of the handle bars for a degree of rotation in respect thereto from a neutral position, mean to bias said second trigger control in said neutral position, means to operatively connect said one trigger control to said first operation means such that rotation of said one trigger control from its neutral position allows rotation of said first ring gear and means to operatively connect said second trigger control to said second operation means such that rotation of said second trigger control from its neutral position allows rotation of said second ring gear to steer the snowblower.

2. The snowblower power assisted steering of claim 1 characterized in that said one control and said second control are rearwardly activated trigger controls.

3. The snowblower power assisted steering control of claim 1 characterized in that said ring gear has an outer surface, said tooth of said first operation means being located on said outer surface of said ring gear, said second ring gear has an outer surface and said tooth of said second operation means being located on said outer surface of said second ring gear.

4. The snowblower power assisted steering control of claim 1 characterized in that said ring gear has an outer surface, said pawl of said first operation means being located radially outward of said outer surface of said ring gear, said second ring gear has an outer surface and said pawl of said second operation means being located radially outward of said outer surface of said second ring gear.

5. The snowblower power assisted steering control claim 1 characterized in that said first ring gear has an outer surface, said pawl of said first operation means being located radially outward of said outer surface of said first ring gear, said second ring gear has an outer surface and said pawl of said second operation means being located radially outward of said outer surface of said second ring gear.

6. The snowblower power assisted steering control of claim 1 characterized in that said first ring gear has an outer surface, said pawl being located radially outward of said outer surface of said ring gear, said second ring gear has an outer surface and said second pawl being located radially outward of said outer surface of said second ring gear.

7. A snowblower having two laterally opposed drive members operationally rotated by an engine, a frame and handle bars having two arms; an improved power assisted steering comprising a power input sun gear assembly, said sun gear assembly having an input drive intermediate to two sun gears, means to selectively connect said input drive to the engine, a first set of planetary gears, said first set of planetary gears surrounding one of said sun gears, a first planet carrier, means to rotatively drivingly connect said first set of planetary gears to said first planet carrier, means to connect said first planet carrier to one of the two drive members, a first ring gear, said first ring gear surrounding said first set of planetary gears, said first ring gear being disconnectably connected to the frame preventing the rotation thereof, first operation means to disconnect said first ring gear from said frame so as to allow the rotation thereof, said first operation means including a pawl engaging a tooth, a second set of planetary gears, said second set of planetary gears surrounding the other of said sun gears, a second planet carrier, means to rotatively drivingly connect said second set of planetary gears to said second planet carrier, means to connect said second planet carrier to the other of the two drive members, a second ring gear, said second ring gear surrounding said second set of planetary gears, said second ring gear being disconnectably connected to the frame preventing the rotation thereof, second operations means to disconnect said second ring gear from said frame so as to allow the rotation thereof, said second operation means including a pawl engaging a tooth, one trigger control, means to pivotally mount said one trigger control to one arm of the handle bars for a degree of rotation in respect thereto from a neutral position, means to bias said one trigger control in said neutral position, a second trigger control, means to pivotally mount said second trigger control to the other arm of the handle bars for a degree of rotation in respect thereto from a neutral position, mean to bias said second trigger control in said neutral position, means to operatively connect said one trigger control to said first operation means such that rotation of said one trigger control from its neutral position allows rotation of said first ring gear, means to operatively connect said second trigger control to said second operation means such that rotation of said second trigger control from its neutral position allows rotation of said second ring gear to steer the snowblower and said one control and said second control being downwardly activated trigger controls.

8. A snowblower having two laterally opposed drive members operationally rotated by an engine through a selectively disengageable clutch, a frame and handle bars, an improved power assisted steering comprising a first clutch member, said first clutch member including a planetary drive having a first disengagement mechanism with teeth and a selectively movable pawl engageable between the frame and said teeth, said first clutch member drivingly connected between the selectively disengageable clutch and one of the two drive members, a second clutch, said second clutch member including a planetary drive having a second disengagement mechanism with teeth and a selectively movable pawl engageable between the frame and said teeth, said second clutch member being drivingly connected between the selectively disengageable clutch and the other of the two drive members, two controls, means to mount one control to the handle bars for movement in respect thereto, means to mount the second control to the handle bars for movement in respect thereto, means to operatively connect said first clutch member to said one control on the handle bars such that movement of said one control disengages said first clutch member and means to operatively connect said second clutch member to said second control on the handle bars such that movement of said second control disengages said second clutch member to steer the snowblower.

9. The snowblower power assisted steering of claim 8 characterized in that said one control and said second control are separate trigger controls.

10. The snowblower power assisted steering of claim 9 characterized in that said one control and said second control are rearwardly activated trigger controls.

11. The snowblower power assisted steering of claim 8 characterized in that said planetary drive of said first and said second clutch members each include a ring gear shiftable between fixed and rotary states through engagement of said pawl with said teeth, a sun gear power input and planet carrier output with a means to selectively shift the pawl so as to engage and disengage the planetary drive respectively between its fixed and rotary states upon operation of said one control and said second control respectively.

12. The snowblower power assisted steering of claim 11 characterized in that said planetary drives are located adjacent to each other with a single common free floating sun gear power input drive assembly.

13. The snowblower power assisted steering of claim 8 wherein the snowblower has a main drive clutch, snowblower clutch and throttle control on the handle bars and characterized in that said one control and said second control are independent of the main clutch, snowblower clutch, and throttle controls on the handle bars.

14. The snowblower power assisted steering of claim 8 characterized in that the snowblower has a variable speed transmission intermediate to the engine and said first and second clutch members, said transmission having two laterally opposed output shafts and said first and second clutch members being mounted directly on said two output shafts respectively.

15. The snowblower power assisted steering control of claim 8 characterized in that said planetary drive of said first clutch member includes a rotating member having an outer surface with said teeth of said first disengagement mechanism being on said outer surface and said planetary drive of said second clutch member includes a rotating member having a second outer surface with said teeth of said second disengagement being on said second outer surface.

16. The snowblower power assisted steering control of claim 8 characterized in that said pawl of said first disengagement mechanism is located radially outward of said teeth of said first disengagement mechanism and said pawl of said second disengagement mechanism is located radially outward of said teeth of said second disengagement mechanism.

17. A snowblower having two laterally opposed drive members operationally rotated by an engine through a selectively disengageable clutch, a frame and handle bars, an improved power assisted steering comprising a first clutch member, said first clutch member including a planetary drive having a first disengagement mechanism with teeth and a selectively movable pawl engageable between the frame and said teeth, said first clutch member drivingly connected between the selectively disengageable clutch and one of the two drive members, a second clutch, said second clutch member including a planetary drive having a second disengagement mechanism with teeth and a selectively movable pawl engageable between the frame and said teeth, said second clutch member being drivingly connected between the selectively disengageable clutch and the other of the two drive members, two controls, means to mount one control to the handle bars for movement in respect thereto, means to mount the second control to the handle bars for movement in respect thereto, means to operatively connect said first clutch member to said one control on the handle bars such that movement of said one control disengages said first clutch member, means to operatively connect said second clutch member to said second control on the handle bars such that movement of said second control disengages said second clutch member to steer the snowblower, and said one control and said second control being downwardly activated trigger controls.

18. A snowblower having two laterally opposed drive members operationally rotated by an engine through a selectively disengageable clutch, a frame and handle bars having two arms, an improved power assisted steering comprising a power input sun gear assembly, said sun gear assembly having an input drive intermediate to two sun gears, means to selectively connect said input drive to the engine, a first set of planetary gears, said first set of planetary gears surrounding one of said sun gears, a first planet carrier, means to rotatively drivingly connect said first set of planetary gears to said first planet carrier, means to connect said first planet carrier to one of the two drive members, a first ring gear, said first ring gear surrounding said first set of planetary gears, said first ring gear having teeth, a pawl, said pawl being movably mounted to the frame at a fixed location in respect thereto, said first ring gear being disconnectedly connected to the frame preventing the rotation thereof by the selective engagement of said pawl with said teeth on said first ring gear, first operation means to move said pawl from engagement with said teeth to disconnect said first ring gear from the frame so as to allow the rotation of said first ring gear, a second set of planetary gears, said second set of planetary gears surrounding the other of said sun gears, a second planet carrier, means to rotatively drivingly connect said second set of planetary gears to said second planet carrier, means to connect said second planet carrier to the other of the two drive members, a second ring gear, said second ring gear surrounding said second set of planetary gears, said second ring gear having teeth, a second pawl, said second pawl being movably mounted to the frame at a fixed location in respect thereto, said second ring gear being disconnectedly connected to the frame preventing the rotation thereof by the selective engagement of said second pawl with said teeth on said second ring gear, second operations means to move second pawl from engagement with said teeth to disconnect said second ring gear from said frame so as to allow the rotation of said second ring gear, one trigger control, means to movably mount said one trigger control to one arm of the handle bars for a degree of movement in respect thereto from a neutral position, means to bias said one trigger control in said neutral position, a second trigger control, means to movably mount said second trigger control to the other arm of the handle bars for a degree of movement in respect thereto from a neutral position, mean to bias said second trigger control in said neutral position, means to operatively connect said one trigger control to said first operation means such that movement of said one trigger control from its neutral position allows rotation of said first ring gear and means to operatively connect said second trigger control to said second operation means such that movement of said second trigger control from its neutral position allows rotation of said second ring gear to steer the snowblower.

19. The snowblower power assisted steering of claim 18 characterized in that said one control and said second control are rearwardly activated trigger controls.

20. The snowblower power assisted steering control of claim 18 characterized in that said first ring gear has an outer surface, said teeth of said first operation means being located on said outer surface of said first ring gear, said second ring gear has an outer surface and said teeth of said second operation means being located on said outer surface of said second ring gear.

21. A snowblower having two laterally opposed drive members operationally rotated by an engine through a selectively disengageable clutch, a frame and handle bars having two arms, an improved power assisted steering comprising a power input sun gear assembly, said sun gear assembly having an input drive intermediate to two sun gears, means to selectively connect said input drive to the engine, a first set of planetary gears, said first set of planetary gears surrounding one of said sun gears, a first planet carrier, means to rotatively drivingly connect said first set of planetary gears to said first planet carrier, means to connect said first planet carrier to one of the two drive members, a first ring gear, said first ring gear surrounding said first set of planetary gears, said first ring gear having teeth, a pawl, said pawl being movably mounted to the frame, said first ring gear being disconnectedly connected to the frame preventing the rotation thereof by the selective engagement of said pawl with said teeth on said first ring gear, first operation means to move said pawl from engagement with said teeth to disconnect said first ring gear from the frame so as to allow the rotation of said first ring gear, a second set of planetary gears, said second set of planetary gears surrounding the other of said sun gears, a second planet carrier, means to rotatively drivingly connect said second set of planetary gears to said second planet carrier, means to connect said second planet carrier to the other of the two drive members, a second ring gear, said second ring gear surrounding said second set of planetary gears, said second ring gear having teeth, a second pawl, said second pawl being movably mounted to the frame, said second ring gear being disconnectedly connected to the frame preventing the rotation thereof by the selective engagement of said second pawl with said teeth on said second ring gear, second operations means to move said second pawl from engagement with said teeth to disconnect said second ring gear from said frame so as to allow the rotation of said second ring gear, one trigger control, means to movably mount said one trigger control to one arm of the handle bars for a degree of movement in respect thereto from a neutral position, means to bias said one trigger control in said neutral position, a second trigger control, means to movably mount said second trigger control to the other arm of the handle bars for a degree of movement in respect thereto from a neutral position, mean to bias said second trigger control in said neutral position, means to operatively connect said one trigger control to said first operation means such that movement of said one trigger control from its neutral position allows rotation of said first ring gear, means to operatively connect said second trigger control to said second operation means such that movement of said second trigger control from its neutral position allows rotation of said second ring gear to steer the snowblower, and said one control and said second control being downwardly activated trigger controls.

22. A snowblower having two laterally opposed drive members operationally rotated by an engine through a selectively disengageable clutch, a frame and handle bars having two arms; an improved power assisted steering comprising a power input sun gear assembly, said sun gear assembly having an input drive intermediate to two sun gears, said sun gear assembly floating in respect to the frame, means to selectively connect said input drive to the selectively disengageable clutch, a first set of planetary gears, said first set of planetary gears surrounding one of said sun gears, a first planet carrier, means to rotatively drivingly connect said first set of planetary gears to said first planet carrier, bearing means to rotatively support said first planet carrier to the frame, means to connect said first planet carrier to one of the two drive members, a first ring gear, said first ring gear surrounding said first set of planetary gears, said first ring gear having teeth, a pawl, said pawl being movably mounted to the frame at a fixed location in respect thereto, said first ring gear being disconnectably connected to the frame preventing the rotation thereof by the selective engagement of said pawl with said teeth on said first ring gear, first operation means to move said pawl from engagement with said teeth of said first ring gear to disconnect said first ring gear from said frame so as to allow the rotation of said first ring gear, a second set of planetary gears, said second set of planetary gears surrounding the other of said sun gears, a second planet carrier, means to rotatively drivingly connect said second set of planetary gears to said second planet carrier, bearing means to rotatively support said first planet carrier to the frame, means to connect said second planet carrier to the other of the two drive members, a second ring gear, said second ring gear surrounding said second set of planetary gears, said second ring gear having teeth, a second pawl, said second pawl being movably mounted to the frame at a fixed location in respect thereto, said second ring gear being disconnectably connected to the frame preventing the rotation thereof by the selective engagement of said second pawl with said teeth on said second ring gear, second operations means to move said second pawl from engagement with said teeth of said second ring gear to disconnect said second ring gear from said frame so as to allow the rotation of said second ring gear, one trigger control, means to pivotally mount said one trigger control to one arm of the handle bars for a degree of rotation in respect thereto from a neutral position, means to bias said one trigger control in said neutral position, a second trigger control, means to pivotally mount said second trigger control to the other arm of the handle bars for a degree of rotation in respect thereto from a neutral position, mean to bias said second trigger control in said neutral position, means to operatively connect said one trigger control to said first operation means such that rotation of said one trigger control from its neutral position allows rotation of said first ring gear and means to operatively connect said second trigger control to said second operation means such that rotation of said second trigger control from its neutral position allows rotation of said second ring gear to steer the snowblower.

23. The snowblower power assisted steering control of claim 22 characterized in that said first ring gear has an outer surface, said teeth of said first ring gear being located on said outer surface of said ring gear, said second ring gear has an outer surface and said teeth of said second ring gear being located on said outer surface of said second ring gear.

* * * * *